(12) United States Patent
Akkarakaran et al.

(10) Patent No.: US 11,690,132 B2
(45) Date of Patent: Jun. 27, 2023

(54) MEDIUM ACCESS CONTROL-CONTROL ELEMENT (MAC-CE) COMMUNICATION

(71) Applicant: QUALCOMM Incorporated, San Diego, CA (US)

(72) Inventors: Sony Akkarakaran, Poway, CA (US); Tao Luo, San Diego, CA (US); Mahmoud Taherzadeh Boroujeni, San Diego, CA (US); Kapil Gulati, Belle Mead, NJ (US); Jung Ho Ryu, Fort Lee, NJ (US); Junyi Li, Chester, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 87 days.

(21) Appl. No.: 17/009,087

(22) Filed: Sep. 1, 2020

(65) Prior Publication Data

US 2021/0068196 A1   Mar. 4, 2021

Related U.S. Application Data

(60) Provisional application No. 62/895,070, filed on Sep. 3, 2019.

(51) Int. Cl.
*H04W 72/04* (2023.01)
*H04W 80/02* (2009.01)
(Continued)

(52) U.S. Cl.
CPC .......... *H04W 80/02* (2013.01); *H04B 7/0626* (2013.01); *H04L 1/1819* (2013.01); *H04L 5/0055* (2013.01); *H04W 76/27* (2018.02)

(58) Field of Classification Search
CPC .... H04W 80/02; H04W 76/27; H04B 7/0626; H04L 1/1819; H04L 1/1671; H04L 5/0055; H04L 5/001; H04L 5/005; H04L 27/2601

See application file for complete search history.

(56) References Cited

U.S. PATENT DOCUMENTS

2010/0296450 A1\* 11/2010 Faniuolo ............... H04L 69/324
  370/465
2015/0163822 A1\* 6/2015 Guo .................... H04W 72/121
  370/329

(Continued)

FOREIGN PATENT DOCUMENTS

WO    WO-2014117391 A1 \*  8/2014  ........... H04L 1/1887

OTHER PUBLICATIONS

International Search Report and Written Opinion—PCT/US2020/049051—ISA/EPO—dated Apr. 7, 2021.

(Continued)

*Primary Examiner* — Mahbubul Bar Chowdhury
(74) *Attorney, Agent, or Firm* — Patterson + Sheridan, L.L.P.

(57) ABSTRACT

Some aspects provide an apparatus for wireless communication, in accordance with some aspects of the present disclosure. The apparatus generally includes at least one processor, and at least one memory communicatively coupled with the at least one processor and storing processor-readable code. The processor-readable code, when executed by the at least one processor, may be configured to transmit a packet including at least one medium access control-control element (MAC-CE), receive hybrid automatic request (HARQ) signaling indicating whether the packet was decoded successfully, determine, in response to the HARQ signaling, whether to retransmit the at least one MAC-CE or transmit at least one other MAC-CE based on whether the packet comprises data, and transmit another packet having the at least one MAC-CE or the at least one other MAC-CE based on the determination.

30 Claims, 10 Drawing Sheets

(51) Int. Cl.
      *H04L 1/1812*     (2023.01)
      *H04W 76/27*     (2018.01)
      *H04L 5/00*       (2006.01)
      *H04B 7/06*       (2006.01)

(56) References Cited

U.S. PATENT DOCUMENTS

| | | | |
|---|---|---|---|
| 2016/0192376 A1* | 6/2016 | Lee | H04W 48/20 |
| | | | 370/252 |
| 2016/0294531 A1 | 10/2016 | Loehr et al. | |
| 2017/0048745 A1* | 2/2017 | Yi | H04W 28/0278 |
| 2017/0257205 A1* | 9/2017 | Loehr | H04W 72/0446 |
| 2017/0310431 A1 | 10/2017 | Iyer et al. | |
| 2019/0115955 A1 | 4/2019 | John Wilson et al. | |
| 2021/0219329 A1* | 7/2021 | Zhou | H04W 72/1257 |

OTHER PUBLICATIONS

Partial International Search Report—PCT/US2020/049051—ISA/EPO—dated Dec. 14, 2020.

* cited by examiner

MEDIUM ACCESS CONTROL-CONTROL ELEMENT (MAC-CE) COMMUNICATION

CROSS-REFERENCE TO RELATED APPLICATION

This application claims benefit of and priority to U.S. Provisional Application No. 62/895,070, filed Sep. 3, 2019, which is hereby assigned to the assignee hereof and hereby expressly incorporated by reference herein in its entirety as if fully set forth below and for all applicable purposes.

TECHNICAL FIELD

Aspects of the present disclosure relate to wireless communications, and more particularly, to techniques for managing medium access control-control element (MAC-CE) communication.

BACKGROUND

Wireless communication systems are widely deployed to provide various telecommunication services such as telephony, video, data, messaging, broadcasts, etc. These wireless communication systems may employ multiple-access technologies capable of supporting communication with multiple users by sharing available system resources (for example, bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

These multiple access technologies have been adopted in various telecommunication standards to provide a common protocol that enables different wireless devices to communicate on a municipal, national, regional, and even global level. New radio (for example, 5G NR) is an example of an emerging telecommunication standard. NR is a set of enhancements to the LTE mobile standard promulgated by 3GPP. NR is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

A medium access control (MAC)-control element (MAC-CE) is a MAC layer communication structure that may be used for control command exchange between wireless nodes. For example, a base station may transmit a MAC CE to a user-equipment (UE) to put the UE into a discontinuous reception (DRX) mode to reduce the UE's power consumption. The MAC-CE may be carried in a shared channel such as a physical downlink shared channel (PDSCH), a physical uplink shared channel (PUSCH), or a physical sidelink shared channel. A MAC-CE may also be used to communicate information that facilitates communication, such as information regarding buffer status and available power headroom.

SUMMARY

The systems, methods, and devices of the disclosure each have several innovative aspects, no single one of which is solely responsible for the desirable attributes.

One innovative aspect of the subject matter described in this disclosure can be implemented in a method for wireless communication. The method includes transmitting a packet including at least one medium access control-control element (MAC-CE), receiving hybrid automatic request (HARQ) signaling indicating whether the packet was decoded successfully, determining, in response to the HARQ signaling, whether to retransmit the at least one MAC-CE or transmit at least one other MAC-CE based on whether the packet comprises data, and transmitting another packet having the at least one MAC-CE or the at least one other MAC-CE based on the determination.

Another innovative aspect of the subject matter described in this disclosure can be implemented in a method for wireless communication. The method includes receiving a packet including at least one MAC-CE, determining whether the packet was decoded successfully, transmitting a negative acknowledgment (NACK) indicating that the packet was not decoded successfully, receiving an indication to avoid adjusting a transmit power of other HARQ signaling in response to reception of at least one other MAC-CE instead of a retransmission of the at least one MAC-CE, and receiving another packet having the at least one other MAC-CE instead of the retransmission of the at least one MAC-CE, wherein the transmit power for the other HARQ signaling is set in accordance with the received indication.

Another innovative aspect of the subject matter described in this disclosure can be implemented in a method for wireless communication. The method includes receiving a packet including at least one medium access control-control element (MAC-CE), determining whether the packet further comprises data, generating HARQ signaling indicating whether the packet was decoded successfully, wherein the HARQ signaling further indicates whether a retransmission of the at least one MAC-CE is required based on the determination of whether the packet further comprises the data, transmitting the HARQ signaling, and receiving another packet including the retransmission of the at least one MAC-CE or at least one other MAC-CE in accordance with the HARQ signaling.

Another innovative aspect of the subject matter described in this disclosure can be implemented in a method for wireless communication. The method includes transmitting control signaling indicating whether a packet to be transmitted comprises data, generating the packet including at least one MAC-CE, transmitting the packet including the at least one MAC-CE, receiving HARQ signaling indicating whether the packet was decoded successfully, wherein the HARQ signaling further indicates whether a retransmission of the at least one MAC-CE is required based on whether the packet comprises the data, and transmitting another packet comprises the retransmission of the at least one MAC-CE or at least one other MAC-CE in accordance with the HARQ signaling.

Another innovative aspect of the subject matter described in this disclosure can be implemented in an apparatus for wireless communication. The apparatus includes at least one processor, and at least one memory communicatively coupled with the at least one processor and storing processor-readable code that, when executed by the at least one processor, is configured to: transmit a packet including at least one MAC-CE; receive HARQ signaling indicating whether the packet was decoded successfully; determine, in response to the HARQ signaling, whether to retransmit the at least one MAC-CE or transmit at least one other MAC-CE based on whether the packet comprises data; and transmit another packet having the at least one MAC-CE or the at least one other MAC-CE based on the determination.

Another innovative aspect of the subject matter described in this disclosure can be implemented in an apparatus for wireless communication. The apparatus includes at least one processor, and at least one memory communicatively coupled with the at least one processor and storing processor-readable code that, when executed by the at least one processor, is configured to: receive a packet including at least one MAC-CE; determine whether the packet was decoded successfully; transmit a NACK indicating that the packet was not decoded successfully; receive an indication to avoid adjusting a transmit power of other HARQ signaling in response to reception of at least one other MAC-CE instead of a retransmission of the at least one MAC-CE; receive another packet having the at least one other MAC-CE instead of the retransmission of the at least one MAC-CE; and transmit the other HARQ signaling, the transmit power for the other HARQ signaling being set in accordance with the received indication.

Another innovative aspect of the subject matter described in this disclosure can be implemented in an apparatus for wireless communication. The apparatus includes at least one processor, and at least one memory communicatively coupled with the at least one processor and storing processor-readable code that, when executed by the at least one processor, is configured to: receive a packet including at least one MAC-CE; determine whether the packet further comprises data; generate HARQ signaling indicating whether the packet was decoded successfully, the HARQ signaling further indicating whether a retransmission of the at least one MAC-CE is required based on the determination of whether the packet further comprises the data; transmit the HARQ signaling; and receive another packet including the retransmission of the at least one MAC-CE or at least one other MAC-CE in accordance with the HARQ signaling.

Another innovative aspect of the subject matter described in this disclosure can be implemented in an apparatus for wireless communication. The apparatus includes at least one processor, and at least one memory communicatively coupled with the at least one processor and storing processor-readable code that, when executed by the at least one processor, is configured to: transmit control signaling indicating whether a packet to be transmitted comprises data; generate the packet including at least one MAC-CE; transmit the packet including the at least one MAC-CE; receive HARQ signaling indicating whether the packet was decoded successfully, the HARQ signaling further indicating whether a retransmission of the at least one MAC-CE is required based on whether the packet comprises the data; and transmit another packet comprises the retransmission of the at least one MAC-CE or at least one other MAC-CE in accordance with the HARQ signaling.

One innovative aspect of the subject matter described in this disclosure can be implemented in an apparatus for wireless communication. The apparatus includes means for transmitting a packet including at least one MAC-CE, means for receiving HARQ signaling indicating whether the packet was decoded successfully, means for determining, in response to the HARQ signaling, whether to retransmit the at least one MAC-CE or transmit at least one other MAC-CE based on whether the packet comprises data, and means for transmitting another packet having the at least one MAC-CE or the at least one other MAC-CE based on the determination.

Another innovative aspect of the subject matter described in this disclosure can be implemented in an apparatus for wireless communication. The apparatus includes means for receiving a packet including at least one MAC-CE, means for determining whether the packet was decoded successfully, means for transmitting a NACK indicating that the packet was not decoded successfully, means for receiving an indication to avoid adjusting a transmit power of other HARQ signaling in response to reception of at least one other MAC-CE instead of a retransmission of the at least one MAC-CE, and means for receiving another packet having the at least one other MAC-CE instead of the retransmission of the at least one MAC-CE, wherein the transmit power for the other HARQ signaling is set in accordance with the received indication.

Another innovative aspect of the subject matter described in this disclosure can be implemented in an apparatus for wireless communication. The apparatus includes means for receiving a packet including at least one MAC-CE, means for determining whether the packet further comprises data, means for generating HARQ signaling indicating whether the packet was decoded successfully, wherein the HARQ signaling further indicates whether a retransmission of the at least one MAC-CE is required based on the determination of whether the packet further comprises the data, transmitting the HARQ signaling, and means for receiving another packet including the retransmission of the at least one MAC-CE or at least one other MAC-CE in accordance with the HARQ signaling.

Another innovative aspect of the subject matter described in this disclosure can be implemented in an apparatus for wireless communication. The apparatus includes means for transmitting control signaling indicating whether a packet to be transmitted comprises data, means for generating the packet including at least one MAC-CE, transmitting the packet including the at least one MAC-CE, means for receiving HARQ signaling indicating whether the packet was decoded successfully, wherein the HARQ signaling further indicates whether a retransmission of the at least one MAC-CE is required based on whether the packet comprises the data, and means for transmitting another packet comprises the retransmission of the at least one MAC-CE or at least one other MAC-CE in accordance with the HARQ signaling.

One innovative aspect of the subject matter described in this disclosure can be implemented in a computer-readable medium having instructions stored thereon to cause an apparatus to transmit a packet including at least one MAC-CE, receive HARQ signaling indicating whether the packet was decoded successfully, determine, in response to the HARQ signaling, whether to retransmit the at least one MAC-CE or transmit at least one other MAC-CE based on whether the packet comprises data, and transmit another packet having the at least one MAC-CE or the at least one other MAC-CE based on the determination.

One innovative aspect of the subject matter described in this disclosure can be implemented in a computer-readable medium having instructions stored thereon to cause an apparatus to receive a packet including at least one MAC-CE, determine whether the packet was decoded successfully, transmit a NACK indicating that the packet was not decoded successfully, receive an indication to avoid adjusting a transmit power of other HARQ signaling in response to reception of at least one other MAC-CE instead of a retransmission of the at least one MAC-CE, and receive another packet having the at least one other MAC-CE instead of the retransmission of the at least one MAC-CE, wherein the transmit power for the other HARQ signaling is set in accordance with the received indication.

One innovative aspect of the subject matter described in this disclosure can be implemented in a computer-readable medium having instructions stored thereon to cause an apparatus to receive a packet including at least one MAC-CE, determine whether the packet further comprises data, generate HARQ signaling indicating whether the packet was decoded successfully, wherein the HARQ signaling further indicates whether a retransmission of the at least one MAC-CE is required based on the determination of whether the packet further comprises the data, transmitting the HARQ signaling, and receive another packet including the retransmission of the at least one MAC-CE or at least one other MAC-CE in accordance with the HARQ signaling.

One innovative aspect of the subject matter described in this disclosure can be implemented in a computer-readable medium having instructions stored thereon to cause an apparatus to transmit control signaling indicating whether a packet to be transmitted comprises data, generating the packet including at least one MAC-CE, transmit the packet including the at least one MAC-CE, receive HARQ signaling indicating whether the packet was decoded successfully, wherein the HARQ signaling further indicates whether a retransmission of the at least one MAC-CE is required based on whether the packet comprises the data, and transmit another packet comprises the retransmission of the at least one MAC-CE or at least one other MAC-CE in accordance with the HARQ signaling.

To the accomplishment of the foregoing and related ends, the one or more aspects comprise the features hereinafter fully described and particularly pointed out in the claims. The following description and the appended drawings set forth in detail some illustrative features of the one or more aspects. These features are indicative, however, of but a few of the various ways in which the principles of various aspects may be employed.

BRIEF DESCRIPTION OF THE DRAWINGS

Details of one or more implementations of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
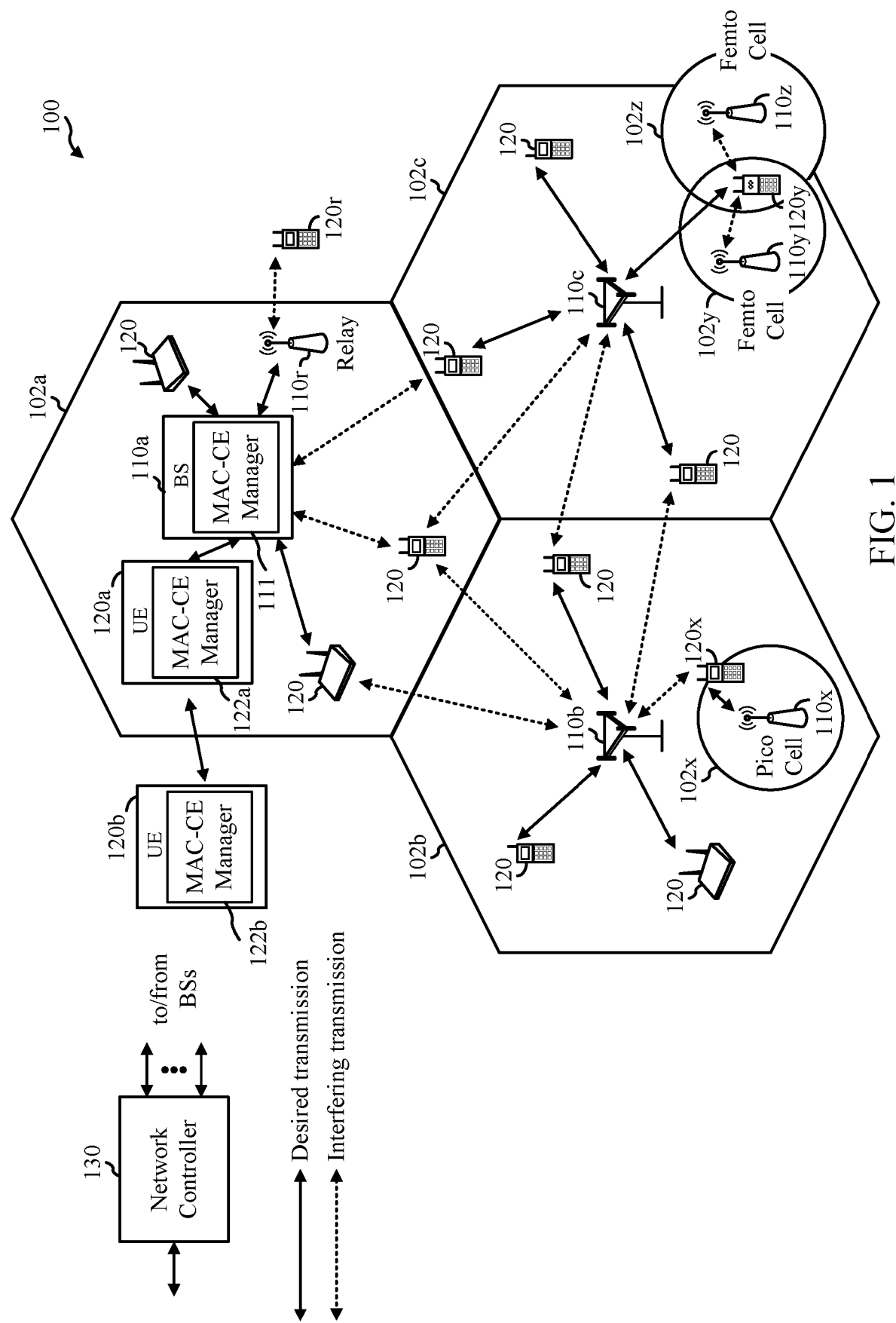
FIG. 1 shows an example wireless communication network in which some aspects of the present disclosure may be performed.

Aspects of the present disclosure provide apparatus, methods, processing systems, and computer readable mediums for managing the communication of a medium access control-control element (MAC-CE). A MAC-CE may be used to indicate various information for sidelink, downlink, and uplink communications. A MAC-CE may be transmitted on a shared channel with or without data. If the shared channel includes data, the shared channel may be retransmitted in response to a negative acknowledgment (NACK) to facilitate combining of the original transmission and the retransmission for decoding. However, if the shared channel does not include data, it may be preferable to transmit a new MAC-CE instead of a retransmission of the previously transmitted MAC-CE. In other words, it may be preferable for the transmitter of the MAC-CE to transmit a new MAC-CE having the latest information (for example, channel state information). Some aspects of the present disclosure describe various protocols for controlling whether a new transmission of MAC-CE, or a retransmission of a previously transmitted MAC-CE is to occur based on whether the shared channel having the MAC-CE also includes data and various other factors associated with the MAC-CE, as described in more detail herein.

The following description provides examples of MAC-CE communication management in communication systems, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, a 5G NR RAT network may be deployed.

FIG. 1 illustrates an example wireless communication network 100 in which aspects of the present disclosure may be performed. For example, the wireless communication network 100 may be an NR system (for example, a 5G NR network). As shown in FIG. 1, the BS 110a and the UEs 120a, 120b may each include a MAC-CE manager 111, 122a, 122b, respectively, that determines whether a MAC-CE retransmission or a new MAC-CE transmission is to occur, in accordance with some aspects of the present disclosure.

NR access (for example, 5G NR) may support various wireless communication services, such as enhanced mobile broadband (eMBB) targeting wide bandwidth (for example, 80 MHz or beyond), millimeter wave (mmWave) targeting high carrier frequency (for example, 25 GHz or beyond), massive machine type communications MTC (mMTC) targeting non-backward compatible MTC techniques, or mission critical services targeting ultra-reliable low-latency communications (URLLC). These services may include latency and reliability requirements. These services may also have different transmission time intervals (TTI) to meet respective quality of service (QoS) requirements. In addition, these services may co-exist in the same time-domain resource (for example, a slot or subframe) or frequency-domain resource (for example, component carrier).

As illustrated in FIG. 1, the wireless communication network 100 may include a number of base stations (BSs) 110a-z (each also individually referred to herein as BS 110 or collectively as BSs 110) and other network entities. A BS 110 may provide communication coverage for a particular geographic area, sometimes referred to as a "cell", which may be stationary or may move according to the location of a mobile BS 110. In some examples, the BSs 110 may be interconnected to one another or to one or more other BSs or network nodes (not shown) in wireless communication network 100 through various types of backhaul interfaces (for example, a direct physical connection, a wireless connection, a virtual network, or the like) using any suitable transport network. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple cells. The BSs 110 communicate with user equipment (UEs) 120a-y (each also individually referred to herein as UE 120 or collectively as UEs 120) in the wireless communication network 100. The UEs 120 (for example, 120x, 120y, etc.) may be dispersed throughout the wireless communication network 100, and each UE 120 may be stationary or mobile.

Wireless communication network 100 may also include relay stations (for example, relay station 110r), also referred to as relays or the like, that receive a transmission of data or other information from an upstream station (for example, a BS 110a or a UE 120r) and sends a transmission of the data or other information to a downstream station (for example, a UE 120 or a BS 110), or that relays transmissions between UEs 120, to facilitate communication between devices.

A network controller 130 may couple to a set of BSs 110 and provide coordination and control for these BSs 110. The network controller 130 may communicate with the BSs 110 via a backhaul. The BSs 110 may also communicate with one another (for example, directly or indirectly) via wireless or wireline backhaul.

Figure 2:
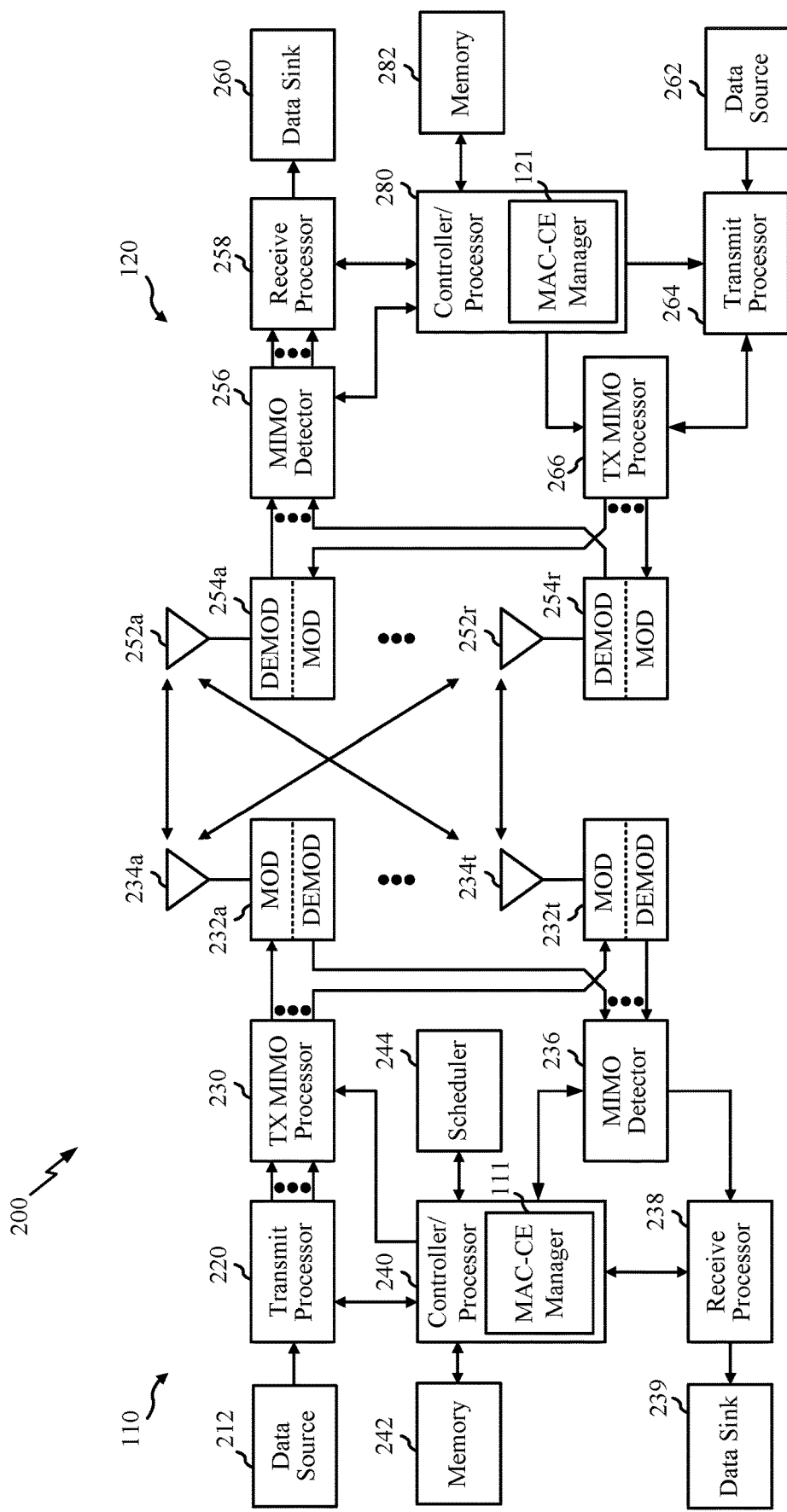
FIG. 2 shows a block diagram illustrating an example base station (BS) and an example user equipment (UE) in accordance with some aspects of the present disclosure.

FIG. 2 shows a block diagram illustrating an example base station (BS) and an example user equipment (UE) in accordance with some aspects of the present disclosure.

At the BS 110, a transmit processor 220 may receive data from a data source 212 and control information from a controller/processor 240. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 220 may process (for example, encode and symbol map) the data and control information to obtain data symbols and control symbols, respectively. The transmit processor 220 may also generate reference symbols, such as for the primary synchronization signal (PSS), secondary synchronization signal (SSS), and cell-specific reference signal (CRS). A transmit (TX) multiple-input multiple-output (MIMO) processor 230 may perform spatial processing (for example, precoding) on the data symbols, the control symbols, or the reference symbols, if applicable, and may provide output symbol streams to the modulators (MODs) 232a-232t. Each modulator 232 may process a respective output symbol stream (for example, for OFDM, etc.) to obtain an output sample stream. Each modulator may further process (for example, convert to analog, amplify, filter, and upconvert) the output sample stream to obtain a downlink signal. Downlink signals from modulators 232a-232t may be transmitted via the antennas 234a-234t, respectively.

At the UE 120, the antennas 252a-252r may receive the downlink signals from the BS 110 and may provide received signals to the demodulators (DEMODs) in transceivers 254a-254r, respectively. Each demodulator 254 may condition (for example, filter, amplify, downconvert, and digitize) a respective received signal to obtain input samples. Each demodulator may further process the input samples (for example, for OFDM, etc.) to obtain received symbols. A MIMO detector 256 may obtain received symbols from all the demodulators 254a-254r, perform MIMO detection on the received symbols if applicable, and provide detected symbols. A receive processor 258 may process (for example, demodulate, deinterleave, and decode) the detected symbols, provide decoded data for the UE 120 to a data sink 260, and provide decoded control information to a controller/processor 280.

On the uplink, at UE 120, a transmit processor 264 may receive and process data (for example, for the physical uplink shared channel (PUSCH)) from a data source 262 and control information (for example, for the physical uplink control channel (PUCCH) from the controller/processor 280. The transmit processor 264 may also generate reference symbols for a reference signal (for example, for the sounding reference signal (SRS)). The symbols from the transmit processor 264 may be precoded by a TX MIMO processor 266 if applicable, further processed by the demodulators in transceivers 254a-254r (for example, for SC-FDM, etc.), and transmitted to the BS 110. At the BS 110, the uplink signals from the UE 120 may be received by the antennas 234, processed by the modulators 232, detected by a MIMO detector 236 if applicable, and further processed by a receive processor 238 to obtain decoded data and control information sent by the UE 120. The receive processor 238 may provide the decoded data to a data sink 239 and the decoded control information to the controller/processor 240.

The memories 242 and 282 may store data and program codes for BS 110 and UE 120, respectively. A scheduler 244 may schedule UEs for data transmission on the downlink or uplink.

The controller/processor 280 or other processors and modules at the UE 120 may perform or direct the execution of processes for the techniques described herein. As shown in FIG. 2, the controller/processor 280 of the UE 120 has a MAC-CE manager 121 that determines whether a MAC-CE retransmission or a new MAC-CE transmission is to occur based on various factors as further described herein. As shown in FIG. 2, the controller/processor 240 of the BS 110 may also include a MAC-CE manager 111 that determines whether a MAC-CE retransmission or a new MAC-CE transmission is to occur based on various factors as further described herein. Although shown at the Controller/Processor, other components of the UE or BS may be used to perform the operations described herein.

Figure 3:
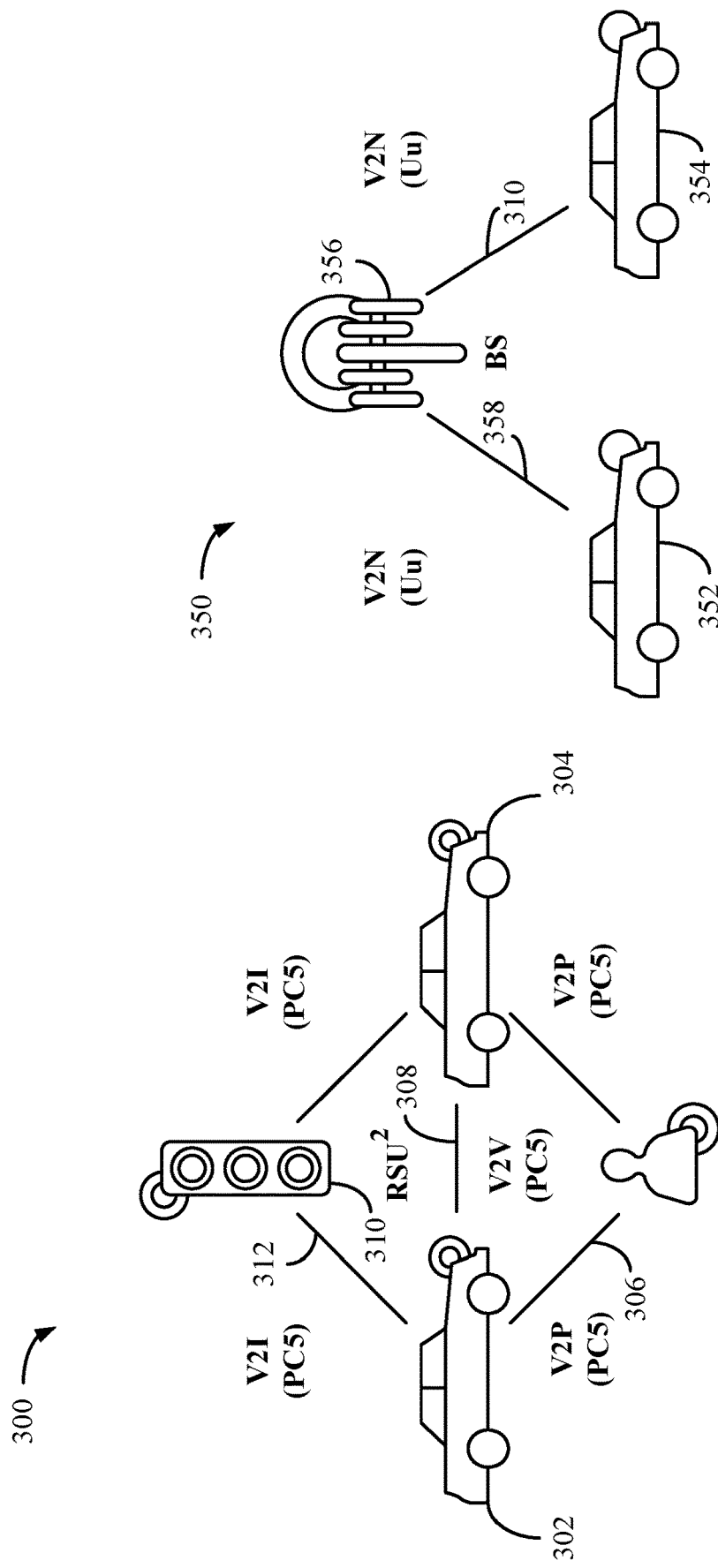
FIGS. 3A and 3B show diagrammatic representations of example vehicle to everything (V2X) systems in accordance with some aspects of the present disclosure.

FIGS. 3A and 3B show diagrammatic representations of example vehicle to everything (V2X) systems in accordance with some aspects of the present disclosure. The V2X systems, provided in FIGS. 3A and 3B provide two complementary transmission modes. A first transmission mode, shown by way of example in FIG. 3A, involves direct communications (for example, also referred to as side link communications) between participants in proximity to one another in a local area. A second transmission mode, shown by way of example in FIG. 3B, involves network communications through a network, which may be implemented over a Uu interface (for example, a wireless communication interface between a radio access network (RAN) and a UE).

Referring to FIG. 3A, a V2X system 300 (for example, including vehicle to vehicle (V2V) communications) is illustrated with two vehicles 302, 304. The first transmission mode allows for direct communication between different participants in a given geographic location. As illustrated, a vehicle can have a wireless communication link 306 with an individual (V2P) (for example, via a UE) through a PC5 interface. Communications between the vehicles 302 and 304 may also occur through a PC5 interface 308. In a like manner, communication may occur from a vehicle 302 to other highway components (for example, highway component 310), such as a traffic signal or sign (V2I) through a PC5 interface 312. With respect to each communication link illustrated in FIG. 3A, two-way communication may take place between elements, therefore each element may be a transmitter and a receiver of information. The V2X system 300 may be a self-managed system implemented without assistance from a network entity. A self-managed system may enable improved spectral efficiency, reduced cost, and increased reliability as network service interruptions do not occur during handover operations for moving vehicles. The V2X system may be configured to operate in a licensed or unlicensed spectrum, thus any vehicle with an equipped system may access a common frequency and share information. Such harmonized/common spectrum operations allow for safe and reliable operation.

FIG. 3B shows a V2X system 350 for communication between a vehicle 352 and a vehicle 354 through a network entity 356. These network communications may occur through discrete nodes, such as a base station (for example, an eNB or gNB), that sends and receives information to and from (for example, relays information between) vehicles 352, 354. The network communications through vehicle to network (V2N) links 358 and 310 may be used, for example, for long range communications between vehicles, such as for communicating the presence of a car accident a distance ahead along a road or highway. Other types of communications may be sent by the node to vehicles, such as traffic flow conditions, road hazard warnings, environmental/weather reports, and service station availability, among other examples. Such data can be obtained from cloud-based sharing services.

Example Techniques for Medium Access
Control-Control Element (MAC-CE)
Communication In some wireless communication systems (for example, 5G NR systems), hybrid automatic request (HARQ) operations are employed to improve the reliability of data transmissions. For example, HARQ operations may provide mechanisms for detecting errors in a transmission (for example, via a cyclic redundancy check) and forward error correction (FEC) coding that introduces redundancy to the information data bits (for example, by adding parity bits based on the data bits) in the transmission to enable a receiver to correct the detected errors. HARQ may also provide a feedback mechanism that enables the receiver to trigger retransmissions from the transmitter in response to detecting an error in a received transmission. For example, a receiver may send HARQ signaling to indicate to a transmitter whether a shared channel has been successfully decoded. In some cases, the receiver may combine retransmissions of the same transport block (TB) to improve decoding performance. For example, a UE may store a received TB having errors in a soft buffer (for example, a HARQ buffer), and when a re-transmission of the TB is received, the UE may combine the received data with the data currently in the HARQ buffer and attempt to decode the combined data.

In some circumstances, two or more subordinate entities (for example, UEs) may communicate with each other using sidelink signals. As described above, V2V and V2X communications are examples of communications that may be transmitted via a sidelink. Other applications of sidelink communications may include public safety or service announcement communications, communications for proximity services, communications for UE-to-network relaying, device-to-device (D2D) communications, Internet of Everything (IoE) communications, Internet of Things (IoT) communications, mission-critical mesh communications, among other suitable applications. Generally, a sidelink may refer to a direct link between one subordinate entity (for example, UE1) and another subordinate entity (for example, UE2). As such, a sidelink may be used to transmit and receive a communication (also referred to herein as a "sidelink signal") without relaying the communication through a scheduling entity (for example, a BS), even though the scheduling entity may be utilized for scheduling or control purposes. In some examples, a sidelink signal may be communicated using a licensed spectrum (unlike wireless local area networks, which typically use an unlicensed spectrum).

Various sidelink channels may be used for sidelink communications, including a physical sidelink discovery channel (PSDCH), a physical sidelink control channel (PSCCH), a physical sidelink shared channel (PSSCH), and a physical sidelink feedback channel (PSFCH). The PSDCH may carry discovery expressions that enable proximal devices to discover each other. The PSCCH may carry control signaling such as sidelink resource configurations and other parameters used for data transmissions, and the PSSCH may carry the data transmissions. The PSFCH may carry feedback such as channel state information (CSI) related to a sidelink channel quality.

As used herein, a "receiver device" generally refers to any wireless node that receives a MAC-CE, and a "transmitter device" generally refers to any wireless node that transmits a MAC-CE. Each of the receiver device and the transmitter device may be any wireless node, such as a UE or BS. Moreover, while some examples provided herein are described with a shared channel having a MAC-CE to facilitate understanding, the aspects of the present disclosure are applicable to any channel having one, or multiple MAC-CEs.

In some cases, a transmitter, such as a base station, may transmit a downlink (DL) command via downlink control information (DCI) over a physical downlink control channel (PDCCH). Similarly, a transmitter, such as a UE, may transmit an uplink (UL) command via uplink control information (UCI) over a physical uplink control channel (PUCCH) or a physical uplink shared channel (PUSCH). However, using DCI or UCI may be less reliable but result in lower latency as compared to using a MAC-CE because, unlike a MAC-CE, no HARQ acknowledgment (ACK)/negative-acknowledgment (NACK) (also referred to herein as "A/N") signaling is implemented for DCI and UCI. DCI and UCI may also have less control information capacity and the type of control information that can be carried in DCI and UCI is not as flexible as that that can be carried in a MAC-CE.

In some cases, a MAC-CE may be used to communicate various information or commands such as information related to a beam change, discontinuous reception (DRX) related information, a power head room (PHR), a buffer status report (BSR), or a recommended bit-rate to be used, among other examples. In some cases, a MAC-CE may be associated with an expiration time (for example, indicating when information indicated by the MAC-CE expires). A MAC-CE may be carried in a shared channel (for example, physical downlink shared channel (PDSCH), physical uplink shared channel (PUSCH), or PSSCH). HARQ signaling may be implemented for the shared channel. Therefore, the communication of the MAC-CE may be reliable, but has a higher latency due to the latency associated with the HARQ operations. For example, a receiver may transmit a HARQ ACK to the transmitter of the MAC-CE to provide confirmation that a command has been received via the MAC-CE.

In some cases, even if high reliability is not necessary, a MAC-CE may still be a convenient way to package control information. For example, for V2X, V2V or other sidelink communications, it may be preferable to use a MAC-CE for channel state information (CSI)-reporting. As another example, it may be preferable to use a MAC-CE because a MAC-CE provides more flexibility in payload size as compared to DCI or UCI.

In some cases, if a packet fails HARQ (for example, the MAC-CE is not successfully decoded by the receiver), it may be desirable to retransmit only the data of the shared channel without retransmitting the MAC-CE included in the original shared channel transmission. For example, the next transmission by the transmitter may include a new MAC-CE, which may be of the same size as or a different size than the original MAC-CE. In some cases, the next transmission may not include a MAC-CE at all. However, in some implementations, if the new transmission does not include a MAC-CE or has a new MAC-CE instead of a retransmission of the original MAC-CE, the receiver cannot perform a HARQ data-combining operation (for example, combining of the original data transmission and the data retransmission for decoding).

In some aspects of the present disclosure, the transmitter may generate a new transmission of a MAC-CE, or a retransmission of an original MAC-CE transmission based on whether the original transmission (for example, a shared channel packet) includes a MAC-CE without data. In other words, a wireless node may determine whether to retransmit the MAC-CE based on whether the original transmission of the MAC-CE is in a shared channel with data. In some implementations, the determination of whether the MAC-CE is to be retransmitted may be made by the transmitter of the MAC-CE (for example, according to a "transmitter-controlled protocol"), or by the receiver of the MAC-CE (for example, according to a "receiver-controlled protocol").

Figure 4:
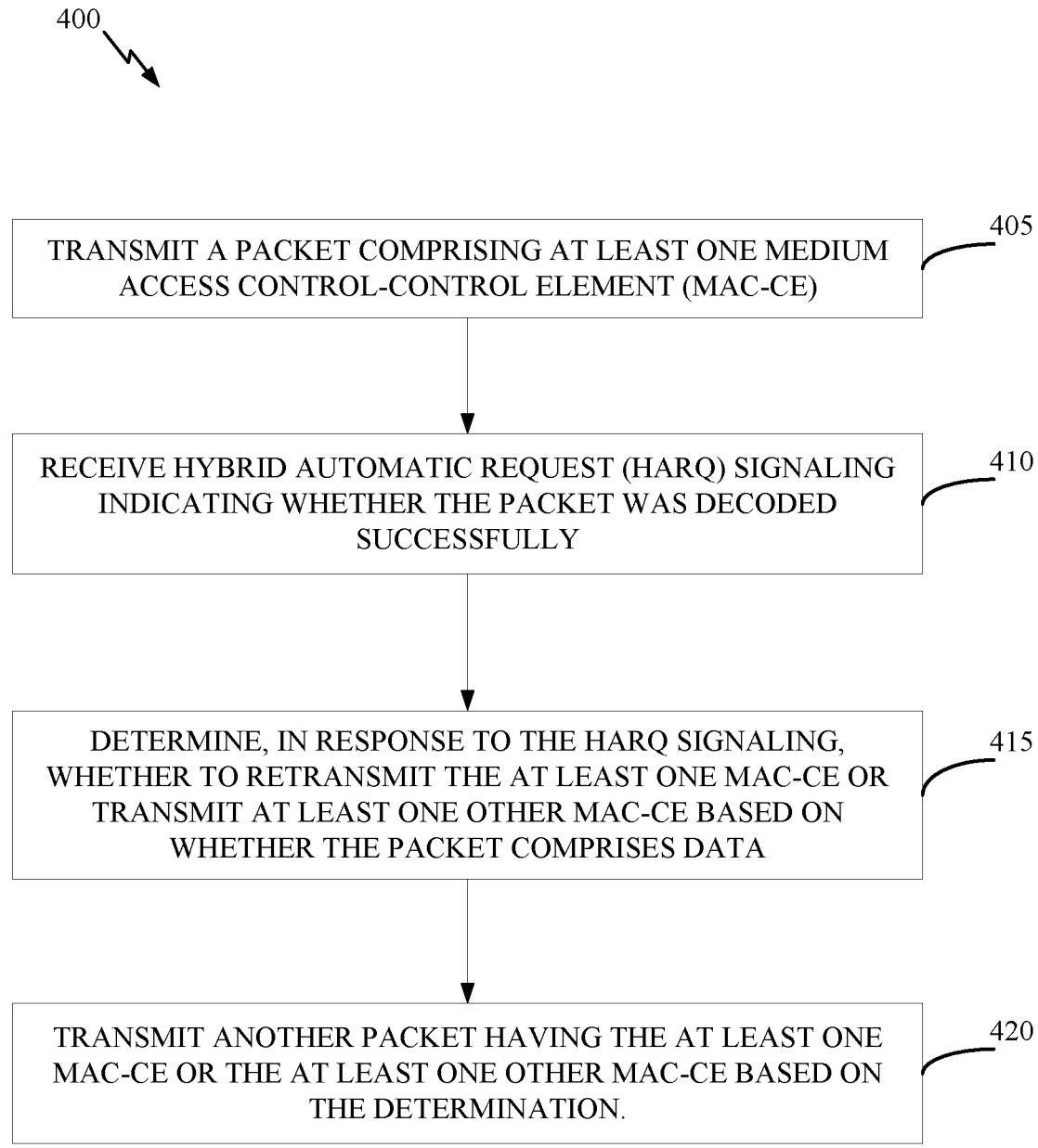
FIG. 4 shows a flowchart illustrating an example process for wireless communication in accordance with some aspects of the present disclosure.

FIG. 4 shows a flowchart illustrating an example process 400 for wireless communication in accordance with some aspects of the present disclosure. In some implementations, the process 400 may be specifically directed to operations that use a transmitter-controlled protocol. The operations of the process 400 may be performed, for example, by a transmitter device such as the BS 110a in the wireless communication network 100 or by a UE such as a UE 120a in the wireless communication network 100.

The operations of the process 400 may be implemented by software components including instructions that are executed on one or more processors (for example, controller/processor 240 or 280 of FIG. 2). Further, the transmission and reception of signals by the transmitter device in process 400 may be enabled, for example, by one or more antennas (for example, antennas 234 or 252 of FIG. 2). In some aspects, the transmission or reception of signals by the transmitter device may be implemented via a bus interface of one or more processors (for example, controller/processor 240 or 280) obtaining or outputting signals.

In some implementations, the process 400 may begin in block 405 with the transmitter device transmitting a packet including one or more MAC-CEs (also referred to as at least one MAC-CE). In block 410, the transmitter device receives HARQ signaling indicating whether the packet was decoded successfully. In block 415, the transmitter device determines, in response to the HARQ signaling, whether to retransmit one or more of the MAC-CEs (also referred to as the original MAC-CE) or whether to transmit at least one other MAC-CE (also referred to as a new MAC-CE) based on whether the packet comprises data. In block 420, the transmitter device transmits, based on the determination in block 415, another packet that may include a retransmission of the original MAC-CE or that may include a new MAC-CE. For example, if the packet does not include data, the transmitter device may determine to transmit a new MAC- CE (for example, an updated MAC-CE), instead of retransmitting the original MAC-CE. Additionally or alternatively, in some cases, the HARQ signaling may indicate that the packet was not decoded successfully (for example, via a NACK) but that a retransmission of the original MAC-CE is not required if the packet having the original MAC-CE does not comprise data.

In some aspects, the determination in block 415 of whether to retransmit a MAC-CE or whether to transmit a new updated MAC-CE is further based on a type of the original MAC-CE. For example, the determination in block 415 may include determining to transmit a new updated MAC-CE if the original MAC-CE is used for CSI-reporting and if the packet having the original MAC-CE does not comprise data.

As another example, the determination of whether to retransmit the original MAC-CE or whether to transmit a new updated MAC-CE in block 415 may be further based on whether the original MAC-CE is associated with an expiration time. For example, some MAC-CE information may only be valid for a limited duration of time. In some such implementations, if the expiration time has passed, the transmitter device may determine in block 415 to transmit a new updated MAC-CE instead of retransmitting the original MAC-CE because the information in the original MAC-CE has expired. On the other hand, if the information in the original MAC-CE has not expired, the transmitter device may determine to retransmit the original MAC-CE in block 415.

As described above, in some instances, the HARQ signaling by the receiver may include a NACK. In such instances, the determination in block 415 may include determining to transmit the new updated MAC-CE instead of retransmitting the original MAC-CE in response to the NACK if the packet does not comprise data, as described in more detail with respect to FIG. 5 below.

Figure 5:
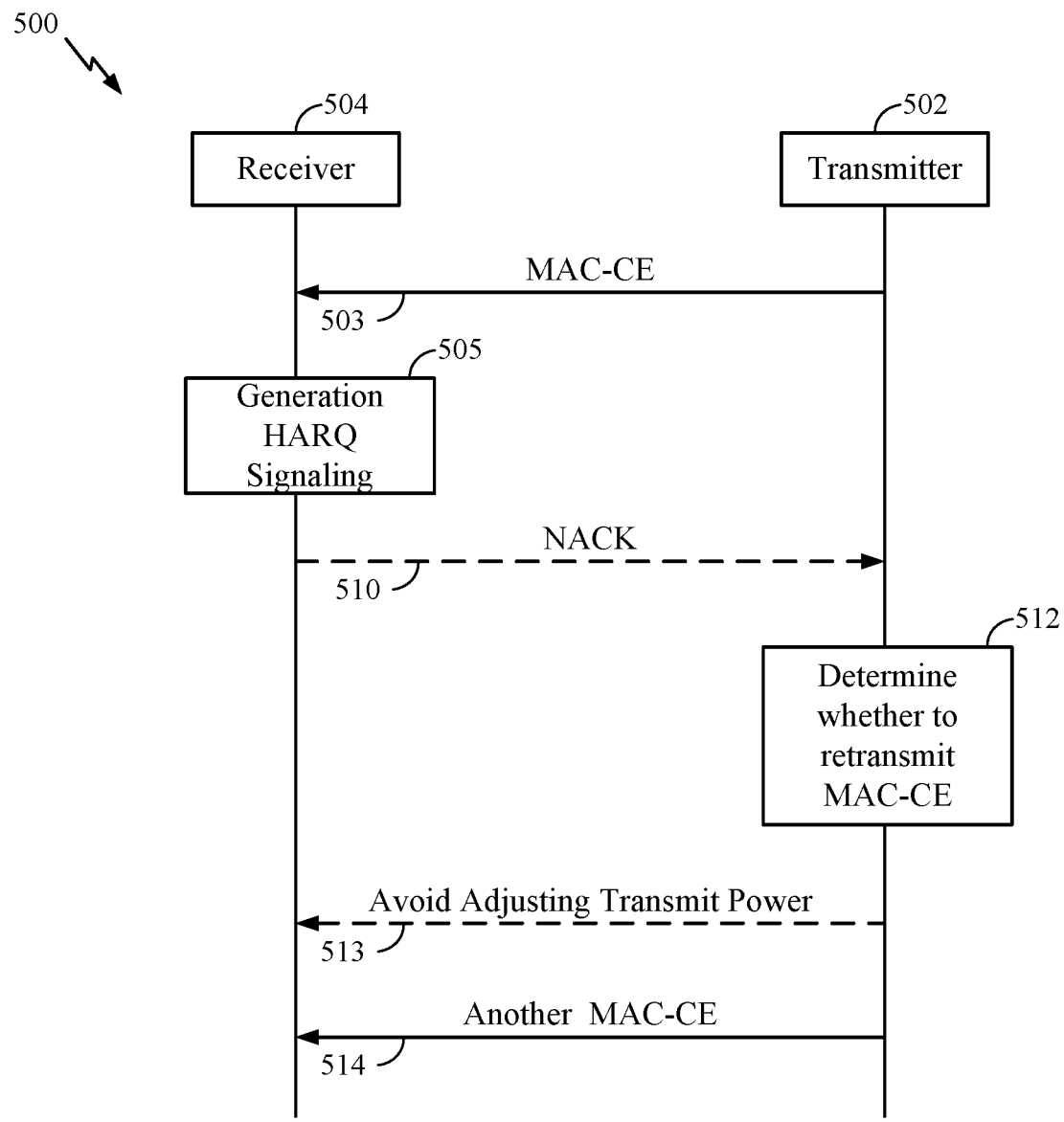
FIG. 5 shows a call-flow diagram illustrating an example process for wireless communication using a transmitter-controlled protocol in accordance with some aspects of the present disclosure.

FIG. 5 shows a call-flow diagram illustrating an example process 500 for wireless communication of MAC-CE using a transmitter-controlled protocol, in accordance with some aspects of the present disclosure. As illustrated, the transmitter device 502 may transmit a MAC-CE 503. In block 505, the receiver device 504 may generate HARQ signaling in response to receiving the MAC-CE 503. For example, if the receiver device 504 fails to successfully decode the packet including the MAC-CE 503, the receiver device 504 may transmit a NACK 510 to the transmitter device 502. In block 512, the transmitter device 502 may determine whether to retransmit the MAC-CE 503, or transmit another MAC-CE 514, based on whether the MAC-CE 503 is in a packet with data, and in some cases, based on various other factors described herein (for example, the type of MAC-CE, or whether the MAC-CE is associated with an expiration time).

Because the receiver device 504 is expecting a retransmission of the MAC-CE 503, if the transmitter device 502 transmits the new MAC-CE 514 instead of retransmitting the MAC-CE 503, the receiver device 504 may adjust a transmit power control loop for further HARQ signaling to be sent. In other words, the receiver device 504 may assume that the NACK 510 was not received by the transmitter device 502, and may increase the transmit power of further HARQ signaling to be transmitted by the receiver device 504. Thus, in some aspects, the transmitter device 502 may transmit control signaling 513 indicating that the receiver device 504 is to avoid adjusting a transmit power for further HARQ signaling in response to the transmission of the new MAC-CE 514, as described in more detail with respect to FIG. 6.

Figure 6:
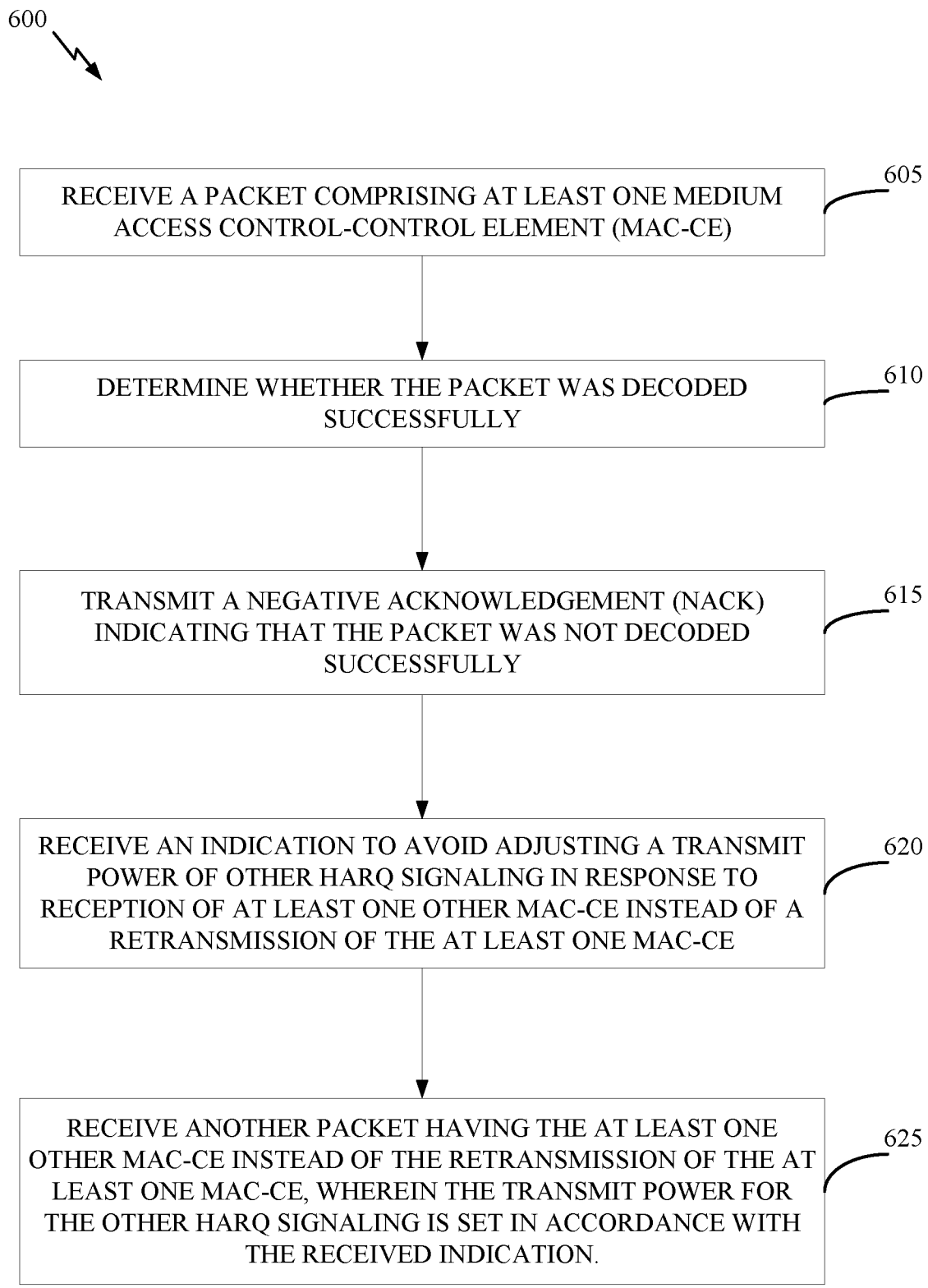
FIG. 6 shows a flowchart illustrating an example process for wireless communication in accordance with some aspects of the present disclosure.

FIG. 6 shows a flowchart illustrating an example process 600 for wireless communication, in accordance with some aspects of the present disclosure. In some implementations, the process 600 may be specifically directed to operations that use a transmitter-controlled protocol. The process 600 may be performed, for example, by a receiver device such as the BS 110*a* in the wireless communication network 100 or the UE 120*a* in the wireless communication network 100.

The operations of the process 600 may be implemented as software components that are executed and run on one or more processors (for example, controller/processor 240 or 280 of FIG. 2). Further, the transmission and reception of signals by the receiver device in process 600 may be enabled, for example, by one or more antennas (for example, antennas 234 or 252 of FIG. 2). In some aspects, the transmission or reception of signals by the receiver device may be implemented via a bus interface of one or more processors (for example, controller/processor 240 or 280) obtaining or outputting signals.

In some implementations, the process 600 may begin, in block 605, by the receiver device receiving a packet including at least one MAC-CE (also referred to as the original MAC-CE), and in block 610, determining whether the packet was decoded successfully. In block 615, the receiver device may transmit a negative acknowledgment (NACK) indicating that the packet was not decoded successfully, and in block 620, receive an indication to avoid adjusting a transmit power of other HARQ signaling in response to reception of a new MAC-CE (also referred to as "at least one other MAC-CE") instead of a retransmission of the original MAC-CE. In block 625, the receiver device may receive another packet having the new MAC-CE instead of the retransmission of the original MAC-CE. In some aspects, the transmit power for the other HARQ signaling may be set in accordance with the received indication. In other words, the receiver device may avoid adjusting the transmit power of the other HARQ signaling even though the receiver device received the new MAC-CE instead of a retransmission of the original MAC-CE. In some cases, the indication to avoid adjusting the transmit power of the other HARQ signaling is received via radio resource control (RRC) signaling, MAC-CE signaling, or control information signaling.

Figure 7:
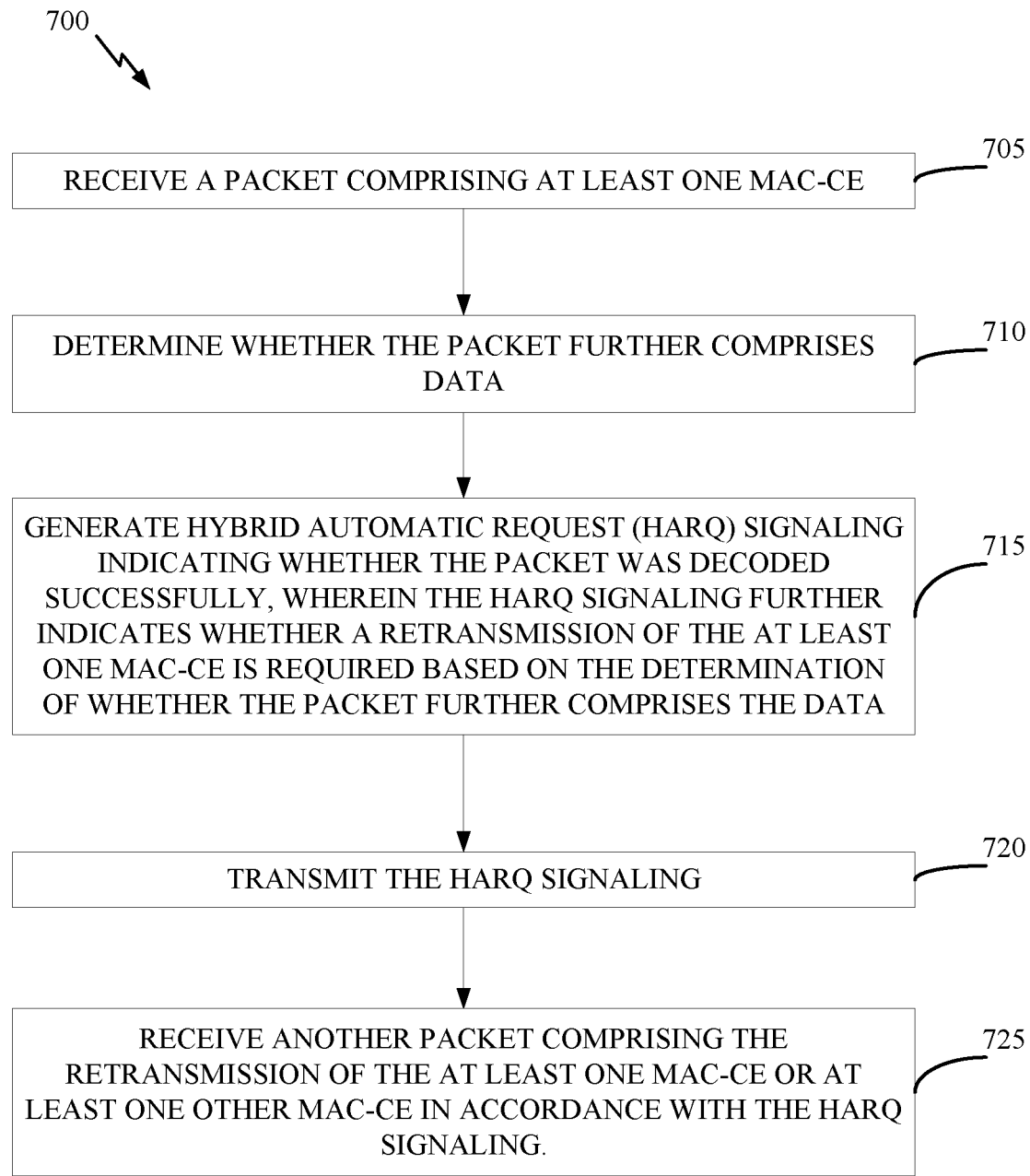
FIG. 7 shows a flowchart illustrating an example process for wireless communication in accordance with some aspects of the present disclosure.

FIG. 7 shows a flowchart illustrating an example process 700 for wireless communication, in accordance with some aspects of the present disclosure. In some implementations, the process 700 may be specifically directed to operations that use a receiver-controlled protocol. The process 700 may be performed, for example, by a receiver device such as the BS 110*a* in the wireless communication network 100 or by a UE such as a UE 120*a* in the wireless communication network 100.

The operations of the process 700 may be implemented as software components that are executed and run on one or more processors (for example, controller/processor 240 or 280 of FIG. 2). Further, the transmission and reception of signals by the receiver device in process 700 may be enabled, for example, by one or more antennas (for example, antennas 234 or 252 of FIG. 2). In some aspects, the transmission or reception of signals by the receiver device may be implemented via a bus interface of one or more processors (for example, controller/processor 240 or 280) obtaining or outputting signals.

The process 700 may begin, in block 705, by the receiver device receiving a packet including at least one MAC-CE (also referred to as the original MAC-CE), and in block 710, determining whether the packet further comprises data. For instance, the receiver device may receive control signaling indicating whether the packet comprises the data, the determination in block 710 being based on the received indication by the control signaling. The receiver device may receive the control signaling prior to the reception of the packet having the original MAC-CE, in some cases.

In block 715, the receiver device may generate HARQ signaling indicating whether the packet was decoded successfully. In some aspects, the HARQ signaling further indicates whether a retransmission of the original MAC-CE is required based on the determination in block 710 of whether the packet further comprises the data. In block 720, the receiver device transmits the HARQ signaling, and in block 725, receives another packet including the retransmission of the original MAC-CE or at least one other MAC-CE (also referred to as a new MAC-CE) in accordance with the HARQ signaling.

In some cases, the packet may not be decoded successfully by the receiver device. In this case, if the packet having the original MC-CE does not include data, the HARQ signaling by the receiver device may indicate that the retransmission of the packet having the original MAC-CE is not required, and a new packet may be transmitted having a new MAC-CE in response to the HARQ signaling. For example, if the packet having the original MAC-CE does not include data, the HARQ signaling may include a NACK indicating that the packet was not decoded successfully but that the retransmission of the packet is not required. As another example, if the packet does not include data, the HARQ signaling may be an ACK indicating that the packet was decoded successfully, as described in more detail with respect to FIG. 8.

Figure 8:
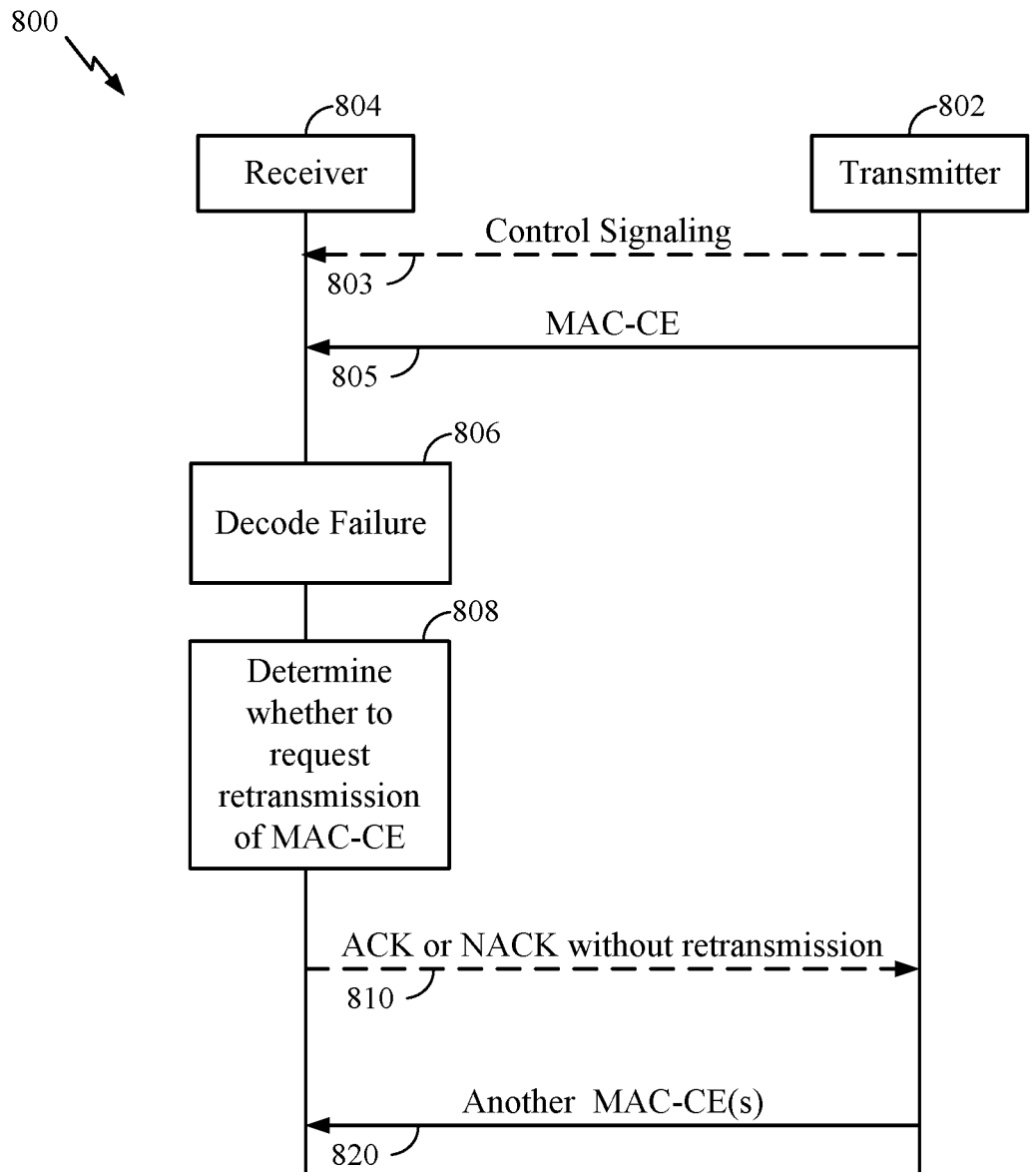
FIG. 8 shows a call flow diagram illustrating an example process for wireless communication using a receiver-controlled protocol in accordance with some aspects of the present disclosure.

FIG. 8 shows a call flow diagram illustrating example process 800 for wireless communication of MAC-CE using a receiver-controlled protocol, in accordance with some aspects of the present disclosure. As illustrated, the transmitter device 802 may send control signaling 803, indicating to the receiver device 804 whether a packet having the MAC-CE 805 also includes data. In some cases, the control signaling 803 may also indicate other MAC-CE information that may be used by the receiver device 804 for determining whether to retransmit the MAC-CE 805, as described in more detail herein. The other MAC-CE information may include the type of the MAC-CE 805 (for example, whether the MAC-CE is for beam-change or is DRX related), the size or the number of MAC-CE to be transmitted in a shared channel (for example, PDSCH, PUSCH, or PSSCH), power head room (PHR)/buffer status report (BSR), recommended bit-rate to be used, and whether the MAC-CE is associated with an expiration timer. For example, if the MAC-CE 805 may be used for CSI reporting and if the packet does not include data, the HARQ signaling may indicate that the retransmission of the packet is not required.

In block 806, the receiver device 804 determines that the decoding of the MAC-CE 805 is unsuccessful, and in block 808, determines whether to request a retransmission of the MAC-CE 805, as described herein. The receiver device 804 then transmits HARQ signaling 810 indicating that a retransmission of the MAC-CE 805 is not required. For example, the HARQ signaling 810 may be a NACK indicating that the MAC-CE 805 was not decoded successfully, but that a retransmission of the MAC-CE 805 is not required, or may be an ACK. Thus, the transmitter device 802 may transmit another MAC-CE 820, as illustrated.

Figure 9:
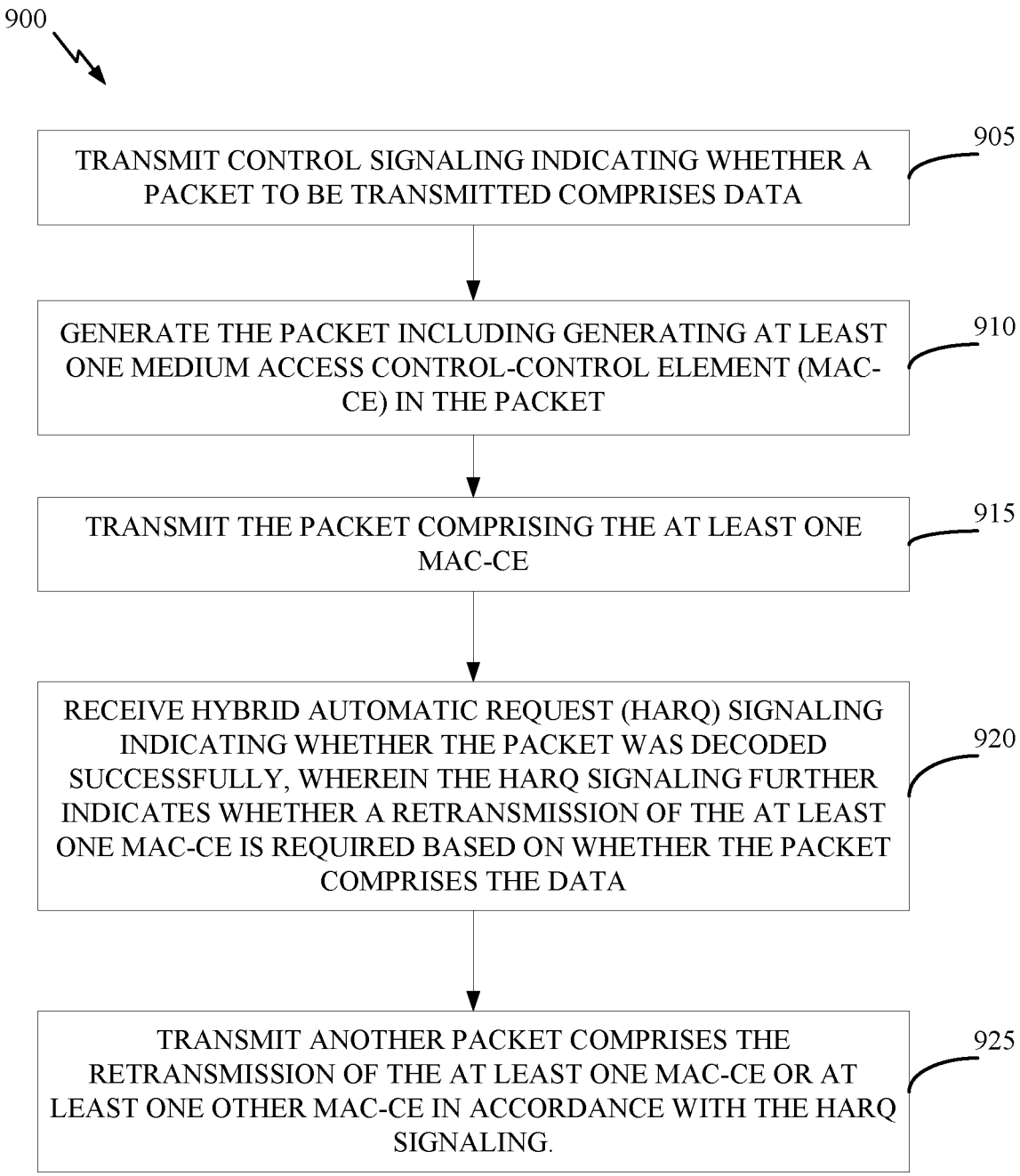
FIG. 9 shows a flowchart illustrating an example process for wireless communication in accordance with some aspects of the present disclosure.

FIG. 9 shows a flowchart illustrating an example process 900 for wireless communication, in accordance with some aspects of the present disclosure. In some implementations, the process 900 may be specifically directed to operations that use a receiver-controlled protocol. The process 900 may be performed, for example, by a transmitter device such as the BS 110a in the wireless communication network 100 or by a UE such as a UE 120a in the wireless communication network 100.

The operations of the process 900 may be implemented as software components that are executed and run on one or more processors (for example, controller/processor 240 or 280 of FIG. 2). Further, the transmission and reception of signals by the transmitter device in process 900 may be enabled, for example, by one or more antennas (for example, antennas 234 or 252 of FIG. 2). In some aspects, the transmission or reception of signals by the transmitter device may be implemented via a bus interface of one or more processors (for example, controller/processor 240 or 280) obtaining or outputting signals.

In some implementations, the process 900 may begin, in block 905, by the transmitter device transmitting control signaling indicating whether a packet to be transmitted comprises data, in block 910, generating the packet including generating at least one MAC-CE (also referred to as the original MAC-CE) in the packet, and in block 915, transmitting the packet including the original MAC-CE. In some aspects, the transmitter device may, in block 920, receive HARQ signaling indicating whether the packet was decoded successfully, where the HARQ signaling further indicates whether to retransmit the original MAC-CE based on whether the packet comprises the data, and in block 925, transmit another packet including the retransmission of the original MAC-CE or at least one other MAC-CE (also referred to as the new MAC-CE) in accordance with the HARQ signaling.

In other words, a transmitter device may use a control channel to indicate information about the original MAC-CE (for example, whether data is present in the payload of a shared channel packet that also includes the original MAC-CE). For example, the control channel may be DCI for DL, SCI for SL, or UCI for UL. The packet information may indicate whether a MAC-CE is present in a shared channel, whether data is present in the shared channel, or whether both data and MAC-CE are present in the shared channel. In some cases, the receiver device may use various parameters indicated by the packet information to determine whether to request a retransmission. For example, the parameters may include the size or the number of MAC-CEs in the shared channel, the types of MAC-CE (for example, whether the MAC-CE is for beam-change or is DRX related), PHR/BSR, recommended bit-rate, and whether the MAC-CE has an expiration time).

From the receiver device perspective, if the MAC-CE information indicates that the packet contains only MAC-CE(s) that are not required to be received with high reliability, the receiver device may indicate ACK even if the receiver device failed to decode the packet resulting in the transmitter device transmitting the latest version of the control information in the MAC-CE, rather than retransmitting the original MAC-CE. In some cases, the receiver device may indicate a NACK to the transmitter device, yet still request that the transmitter device not retransmit the original MAC-CE so that the transmitter prioritizes transmission of the latest version of the control information in a MAC-CE. For instance, a wireless node may be implemented to use additional A/N signaling. For example, a three-state A/N signaling (for example, ACK, NACK with retransmission, and NACK without retransmission) or additional A/N bits may be implemented to indicate either ACK, NACK with retransmission, or NACK without retransmission.

As an example for sidelink (for example, UE to UE communication, as described with respect to FIG. 3A), a receiver may determine that an original MAC-CE includes a CSI-report and should not be retransmitted, even if the original MAC-CE was not successfully decoded, since it is preferable for the transmitter device to retransmit a new MAC-CE having the latest CSI information. As another example, some MAC-CEs (for example, related to beam-change) may have an expiration time defined. For instance, the information indicated by the MAC-CE may only be valid for a limited duration (e.g., 3 ms) after sending the ACK for the shared channel carrying the MAC-CE. Therefore, the MAC-CE may be urgent, and the receiver may request that the MAC-CE be retransmitted, or if the expiration time has expired, a new transmission may be requested instead of a retransmission of the original MAC-CE transmission.

In a transmitter-controlled protocol, instead of the transmitter device indicating the MAC-CE information to the receiver device, the transmitter device may determine not to retransmit the original MAC-CE even if the transmitter device receives a NACK from the receiver device. For instance, for a packet with only MAC-CEs of low reliability requirement, the transmitter device may determine to send a new transmission instead of a retransmission of an original MAC-CE, even if the transmitter device receives a NACK indicating that the original MAC-CE was not successfully decoded at the receiver.

With regards to an access link (for example, link between UE and BS), the transmitter device may send a new transmission instead of a retransmission in response to a NACK on DL (for example, when the transmitter is the BS, which controls the new or retransmission packet). For UL however, the A/N signal may be in the form of a new data indicator in the UL grant (for example, UCI) which the UE may have to honor. In other words, if the UL grant is for a retransmission (for example, based on a new data indicator (NDI) bit in the grant), the UE may have to honor the UL grant and retransmit the MAC-CE because the BS is expecting the retransmission in order to combine the retransmission and the original transmission to facilitate decoding. Therefore, if the UE receives a NACK associated with an original MAC-CE transmission, and transmits a new MAC-CE instead of a retransmission of the original MAC-CE, the BS may interpret the reception of the new MAC-CE as an ACK error and adjust a transmit power control loop for a following A/N transmission based on this event. In other words, the BS may not be aware that the UE has transmitted a new MAC-CE instead of a retransmission of the original MAC-CE. The BS may therefore attempt to combine the new transmission from the UE with the original transmission. That is, the BS may assume that the latest transmission from the UE is a retransmission and therefore attempt HARQ-combining, but it will be unable to combine the transmissions to correct for decoding errors. The BS may then increase the power of a following A/N transmission (also referred to herein as "other HARQ signaling").

Similarly, with regards to DL and SL transmissions of a MAC-CE, an ACK error may result at a receiving UE after a transmitter device (a base station or another UE) transmits a new packet having a new MAC-CE instead of a retransmission of an original MAC-CE. At least for SL and DL channels, unnecessary power adjustment may be prevented by specification, by an RRC/MAC-CE based configuration, or by adding a field (for example, power control adjustment prevention field) in the scheduling grant (for example, DCI or SCI), as described herein. In some aspects, the BS may indicate to the UE that the new packet is a new transmission of the MAC-CE such that the UE does not determine that an ACK error has occurred and does not adjust the power control of the following A/N transmission.

In some cases, a transport block (TB) of a shared channel may be implemented with a single code block (CB), in which case, a single A/N may be communication for the TB. In other cases, a TB may be implemented with multiple CBs, also referred to as a CB group (CBG). In this case, an ACK may be indicated if all the CBGs are decoded, and a NACK may be indicated otherwise. With respect to the receiver-controlled protocol described herein, if the receiver device transmits an ACK even though the receiver device could not decode the MAC-CE, the transmitter device may assume that all CBGs were decoded successfully. Alternatively, the receiver device may indicate to the transmitter device that some CBGs were not decoded successfully, but that the CBGs need not be retransmitted even though the CBGs were not decoded successfully. In this case, the decoded CBGs may either be partially processed (for example, for processing MAC-CE commands the decoded CBGs contain) or rejected all together, based on behavior that may be defined in the specification. With respect to the transmitter-controlled protocol, the indication to avoid adjusting the transmit power of HARQ signaling may be sent separately per CB/CBG or could apply to the entire TB, as the outer control loop may react on a per CB/CBG basis or on a TB basis.

Figure 10:
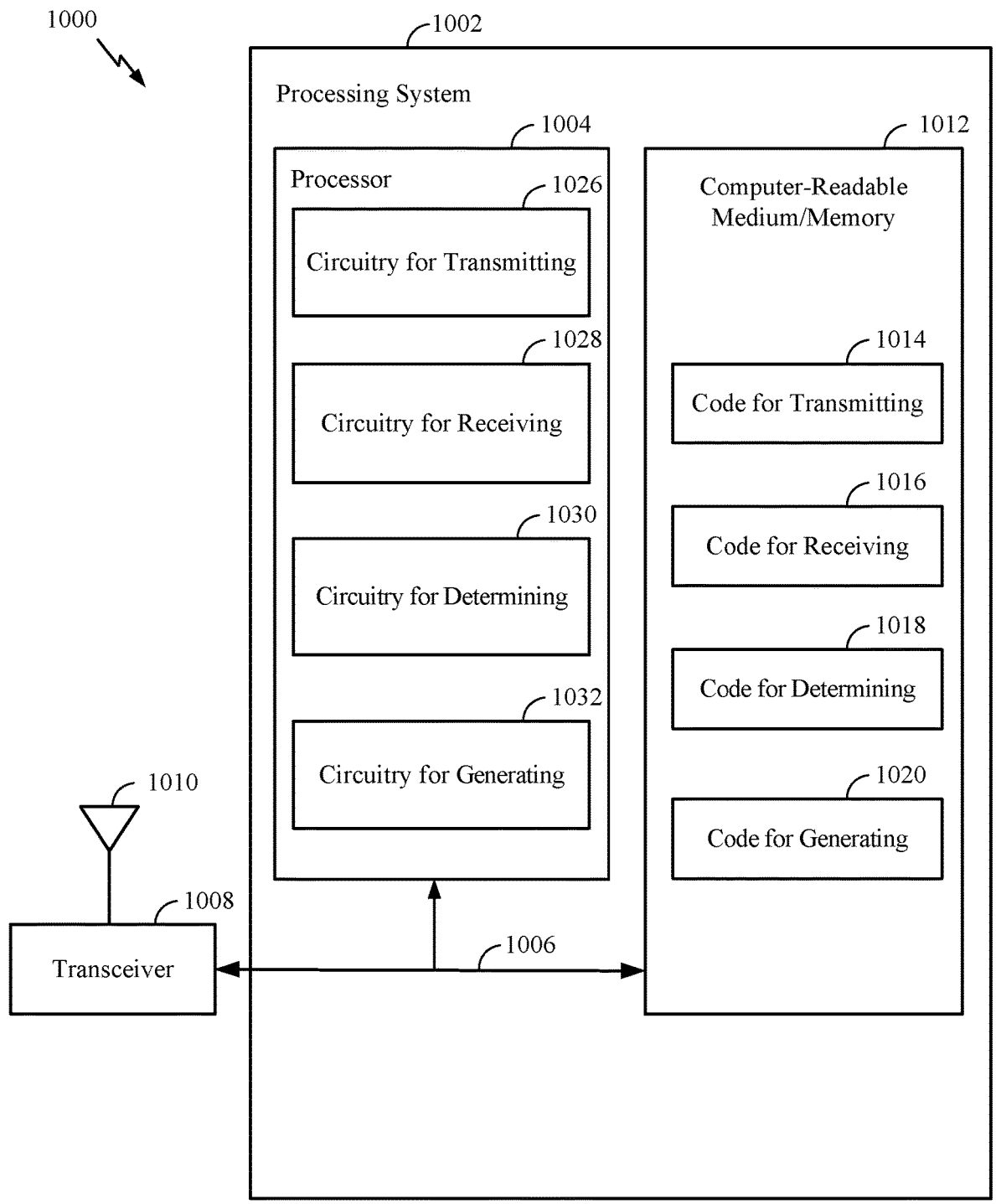
FIG. 10 shows a block diagram of an example wireless communication device that includes various components configured to perform the techniques disclosed herein in accordance with aspects of the present disclosure.

FIG. 10 shows a block diagram of an example communication device 1000 (for example, UE 120a or UE 120b shown in FIG. 1, or BS 110 as shown in FIG. 1) that may include various components (for example, corresponding to means-plus-function components) configured to perform operations for the techniques disclosed herein, such as the operations illustrated in FIGS. 4-9. The communications device 1000 includes a processing system 1002 coupled to a transceiver 1008 (for example, a transmitter or receiver). The transceiver 1008 is configured to transmit and receive signals for the communications device 1000 via an antenna 1010, such as the various signals as described herein. The processing system 1002 may be configured to perform processing functions for the communications device 1000, including processing signals received or to be transmitted by the communications device 1000.

The processing system 1002 includes a processor 1004 coupled to a computer-readable medium/memory 1012 via a bus 1006. In some aspects, the computer-readable medium/memory 1012 is configured to store instructions (for example, computer-executable code) that when executed by the processor 1004, cause the processor 1004 to perform the operations illustrated in FIGS. 4-9, or other operations for performing the various techniques discussed herein for managing communication of a MAC-CE.

In some aspects, computer-readable medium/memory 1012 stores code for transmitting 1014, code for receiving 1016, code for determining 1018 (e.g., determining whether to retransmit, determining whether a packet was decoded successfully, or determining whether a packet includes data), and code for generating 1020 (e.g., generating a packet including a MAC-CE or generating HARQ signaling). In some aspects, the processor 1004 has circuitry configured to implement the code stored in the computer-readable medium/memory 1012. The processor 1004 includes circuitry for transmitting 1026, circuitry for receiving 1028, circuitry for determining 1030, and circuitry for generating 1032.

The techniques described herein may be used for various wireless communication technologies, such as NR (for example, 5G NR), 3GPP Long Term Evolution (LTE), LTE-Advanced (LTE-A), code division multiple access (CDMA), time division multiple access (TDMA), frequency division multiple access (FDMA), orthogonal frequency division multiple access (OFDMA), single-carrier frequency division multiple access (SC-FDMA), time division synchronous code division multiple access (TD-SCDMA), and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS). LTE and LTE-A are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). NR is an emerging wireless communications technology under development.

The techniques described herein may be used for the wireless networks and radio technologies mentioned above as well as other wireless networks and radio technologies. For clarity, while aspects may be described herein using terminology commonly associated with 3G, 4G, or 5G wireless technologies, aspects of the present disclosure can be applied in other generation-based communication systems.

In 3GPP, the term "cell" can refer to a coverage area of a Node B (NB) or a NB subsystem serving this coverage area, depending on the context in which the term is used. In NR systems, the term "cell" and BS, next generation NodeB (gNB or gNodeB), access point (AP), distributed unit (DU), carrier, or transmission reception point (TRP) may be used interchangeably. A BS may provide communication coverage for a macro cell, a pico cell, a femto cell, or other types of cells. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having an association with the femto cell (for example, UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS.

A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (for example, a smart ring, a smart bracelet, etc.), an entertainment device (for example, a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (for example, remote device), or some other entity. A wireless node may provide, for example, connectivity for or to a network (for example, a wide area network such as Internet or a cellular network) via a wired or wireless communication link. Some UEs may be considered Internet-of-Things (IoT) devices, which may be narrowband IoT (NB-IoT) devices.

Some wireless networks (for example, LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (for example, 6 RBs), and there may be 1, 2, 4, 8, or 16 subbands for system bandwidth of 1.25, 2.5, 5, 10 or 20 MHz, respectively. In LTE, the basic transmission time interval (TTI) or packet duration is the 1 ms subframe.

NR may utilize OFDM with a CP on the uplink and downlink and include support for half-duplex operation using TDD. In NR, a subframe is still 1 ms, but the basic TTI is referred to as a slot. A subframe contains a variable number of slots (for example, 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing. Beamforming may be supported and beam direction may be dynamically configured. MIMO transmissions with precoding may also be supported. In some examples, MIMO configurations in the DL may support up to 8 transmit antennas with multi-layer DL transmissions up to 8 streams and up to 2 streams per UE. In some examples, multi-layer transmissions with up to 2 streams per UE may be supported. Aggregation of multiple cells may be supported with up to 8 serving cells.

In some examples, access to the air interface may be scheduled. A scheduling entity (for example, a BS) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (for example, one or more other UEs), and the other UEs may utilize the resources scheduled by the UE for wireless communication. In some examples, a UE may function as a scheduling entity in a peer-to-peer (P2P) network, or in a mesh network. In a mesh network example, UEs may communicate directly with one another in addition to communicating with a scheduling entity.

As used herein, the term "determining" may encompass one or more of a wide variety of actions. For example, "determining" may include calculating, computing, processing, deriving, investigating, looking up (for example, looking up in a table, a database or another data structure), and the like. Also, "determining" may include receiving (for example, receiving information), accessing (for example, accessing data in a memory) and the like. Also, "determining" may include resolving, selecting, choosing, establishing and the like.

As used herein, "or" is used intended to be interpreted in the inclusive sense, unless otherwise explicitly indicated. For example, "a or b" may include a only, b only, or a combination of a and b. As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations and algorithm processes described in connection with the implementations disclosed herein may be implemented as electronic hardware, firmware, software, or combinations of hardware, firmware or software, including the structures disclosed in this specification and the structural equivalents thereof. The interchangeability of hardware, firmware and software has been described generally, in terms of functionality, and illustrated in the various illustrative components, blocks, modules, circuits and processes described above. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described above as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one or more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

The invention claimed is:

1. An apparatus for wireless communication, comprising:
at least one processor; and
at least one memory communicatively coupled with the at least one processor and storing processor-readable code that, when executed by the at least one processor, causes the apparatus to:
receive a packet including at least one medium access control-control element (MAC-CE);
determine whether the packet further comprises data;
generate hybrid automatic request (HARQ) signaling indicating whether the packet was decoded successfully, whether a retransmission of the at least one MAC-CE is required when the determination is that the packet further comprises the data, and that a retransmission of the at least one MAC-CE is not required when the determination is that the packet does not further comprise the data;
transmit the HARQ signaling; and
receive another packet including the retransmission of the at least one MAC-CE or at least one other MAC-CE in accordance with the HARQ signaling.

2. The apparatus of claim 1, wherein the memory and the one or more processors are further configured to cause the apparatus to receive control signaling indicating whether the packet comprises the data, the determination being based on the received indication by the control signaling.

3. The apparatus of claim 2, wherein the control signaling is received prior to the reception of the packet.

4. The apparatus of claim 1, wherein the packet is not decoded successfully, and wherein, if the packet does not comprise data, the HARQ signaling indicates that the retransmission of the packet is not required and the other packet is received having the at least one other MAC-CE in response to the HARQ signaling.

5. The apparatus of claim 1, wherein, if the packet does not comprise data, the HARQ signaling comprises a negative acknowledgment (NACK) indicating that the packet was not decoded successfully but that the retransmission of the packet is not required.

6. The apparatus of claim 1, wherein the packet is not decoded successfully, and wherein, if the packet does not comprise data, the HARQ signaling comprises an acknowledgment (ACK) indicating that the packet was decoded successfully.

7. The apparatus of claim 1, wherein, if the at least one MAC-CE is used for channel state information (CSI) reporting and if the packet does not comprise data, the HARQ signaling indicates that the retransmission of the packet is not required.

8. The apparatus of claim 1, wherein the packet is not decoded successfully, and wherein the HARQ signaling indicates whether the retransmission of the at least one MAC-CE is required depending on a type of the at least one MAC-CE and whether the packet comprises the data.

9. The apparatus of claim 1, wherein the packet is not decoded successfully, and wherein, based on whether the at least one MAC-CE is associated with an expiration time, the HARQ signaling indicates whether the retransmission of the at least one MAC-CE is required.

10. The apparatus of claim 1, wherein the at least one MAC-CE comprises a plurality of MAC-CEs, and wherein the packet comprises a plurality of code block groups (CBGs), each CBG being associated with one or more of the plurality of MAC-CEs.

11. The apparatus of claim 10, wherein the HARQ signaling indicates that a portion of the plurality of CBGs have not been decoded successfully, but that the retransmission of the portion of the plurality of CBGs is not required.

12. The apparatus of claim 1, wherein the packet is received on a sidelink channel.

13. An apparatus for wireless communication, comprising:
   at least one processor; and
   at least one memory communicatively coupled with the at least one processor and storing processor-readable code that, when executed by the at least one processor, causes the apparatus to:
      transmit control signaling indicating whether a packet to be transmitted comprises data;
      generate the packet including generating at least one medium access control-control element (MAC-CE) in the packet;
      transmit the packet including the at least one MAC-CE;
      receive hybrid automatic request (HARQ) signaling indicating whether the packet was decoded successfully, whether a retransmission of the at least one MAC-CE is required when the packet comprises the data, and that a retransmission of the at least one MAC-CE is not required when the packet does not comprise the data; and
      transmit another packet comprises the retransmission of the at least one MAC-CE or at least one other MAC-CE in accordance with the HARQ signaling.

14. The apparatus of claim 13, wherein the control signaling is transmitted prior to the transmission of the packet.

15. The apparatus of claim 13, wherein, if the packet does not comprise data, the HARQ signaling indicates that the retransmission of the packet is not required and the other packet is received having the at least one other MAC-CE in response to the HARQ signaling.

16. The apparatus of claim 13, wherein, if the packet does not comprise data, the HARQ signaling comprises a negative acknowledgment (NACK) indicating that the packet was not decoded successfully but that the retransmission of the packet is not required.

17. The apparatus of claim 13, wherein the HARQ signaling comprises an acknowledgment (ACK) indicating that the packet was decoded successfully.

18. The apparatus of claim 13, wherein the at least one MAC-CE comprises a plurality of MAC-CEs, and wherein the packet comprises a plurality of code block groups (CBGs), each CBG being associated with one or more of the plurality of MAC-CEs.

19. The apparatus of claim 18, wherein the HARQ signaling indicates that a portion of the plurality of CBGs have not been decoded successfully, but that a retransmission of the portion of the plurality of CBGs is not required.

20. The apparatus of claim 13, wherein the packet is transmitted on a sidelink channel.

21. A method for wireless communications, comprising:
   receiving a packet including at least one medium access control-control element (MAC-CE);
   determining whether the packet further comprises data;
   generating hybrid automatic request (HARQ) signaling indicating whether the packet was decoded successfully, whether a retransmission of the at least one MAC-CE is required when the determination is that the packet further comprises the data, and that a retransmission of the at least one MAC-CE is not required when the determination is that the packet does not further comprise the data;
   transmitting the HARQ signaling; and
   receiving another packet including the retransmission of the at least one MAC-CE or at least one other MAC-CE in accordance with the HARQ signaling.

22. The method of claim 21, further comprising receiving control signaling indicating whether the packet comprises the data, wherein the determining is based on the received indication by the control signaling.

23. The method of claim 21, wherein the packet is not decoded successfully, and wherein, if the packet does not comprise data, the HARQ signaling indicates that the retransmission of the packet is not required and the other packet is received having the at least one other MAC-CE in response to the HARQ signaling.

24. The method of claim 21, wherein the packet is not decoded successfully, and wherein, if the packet does not comprise data, the HARQ signaling comprises an acknowledgment (ACK) indicating that the packet was decoded successfully.

25. The method of claim 21, wherein the packet is not decoded successfully, and wherein the HARQ signaling indicates whether the retransmission of the at least one MAC-CE is required depending on a type of the at least one MAC-CE and whether the packet comprises the data.

26. A method for wireless communications, comprising:
   transmitting control signaling indicating whether a packet to be transmitted comprises data;
   generating the packet including generating at least one medium access control-control element (MAC-CE) in the packet;
   transmitting the packet including the at least one MAC-CE;
   receiving hybrid automatic request (HARQ) signaling indicating whether the packet was decoded successfully, whether a retransmission of the at least one MAC-CE is required when the packet comprises the data, and that a retransmission of the at least one MAC-CE is not required when the packet does not comprise the data; and transmitting another packet comprising the retransmission of the at least one MAC-CE or at least one other MAC-CE in accordance with the HARQ signaling.

27. The method of claim 26, wherein the control signaling is transmitted prior to the transmitting of the packet.

28. The method of claim 26, wherein, if the packet does not comprise data, the HARQ signaling indicates that the retransmission of the packet is not required and the other packet is received having the at least one other MAC-CE in response to the HARQ signaling.

29. The method of claim 26, wherein, if the packet does not comprise data, the HARQ signaling comprises a negative acknowledgment (NACK) indicating that the packet was not decoded successfully but that the retransmission of the packet is not required.

30. The method of claim 26, wherein the HARQ signaling comprises an acknowledgment (ACK) indicating that the packet was decoded successfully.

* * * * *